UNITED STATES PATENT OFFICE.

WILLIAM FRISHMUTH, OF PHILADELPHIA, PA., ASSIGNOR TO HIMSELF, AND GEORGE R. BLANCHARD AND EMERSON FOOTE, OF NEW YORK, N. Y.

PROCESS OF EXTRACTING ALUMINIUM FROM CORUNDUM, &c.

SPECIFICATION forming part of Letters Patent No. 282,621, dated August 7, 1883.

Application filed March 9, 1883. (Specimens.)

*To all whom it may concern:*

Be it known that I, WILLIAM FRISHMUTH, of Philadelphia, in the county of Philadelphia and State of Pennsylvania, have invented or discovered a new and useful Process for Extracting Aluminium from Cryolite, Corundum, Bauxite, and other substances containing such metal; and I do hereby declare that the following is a full, clear, and exact description of the invention or discovery, which will enable those skilled in the art to practice or use the same.

Heretofore the practiced method of extracting aluminium from its ores or from substances containing it has been to first change such substances into a chloride of aluminium, and then to separate the metal therefrom by the use of metallic sodium acting as a reagent. This method or process has been found to be impracticable in the treatment of large quantities of material on account of the great cost of metallic sodium.

My method or process differs materially from those now in use; and it consists in first converting the material into fluoride of aluminium and then producing the metal directly therefrom by the action of sodium vapor or gas generated by heating a mixture of carbonate of soda or an equivalent thereof with charcoal and chalk or lime, said gas or vapor being brought into immediate contact with the fluoride.

In practicing my newly-discovered process I take equal parts, by weight, of corundum, bauxite, or other materials containing aluminium, and of fluor-spar, and place them in a furnace or retort having a suitable bottom upon which to put the material to be treated; or the material may be put in crucibles placed in the furnace, the object of this step of my process being to expel all moisture from the material and to properly calcine it, which will be done by heating the furnace or retort to a bright-red heat. When the calcining of the material has been effected, the mass is withdrawn from the retort, and when cold is pulverized or broken into small pieces. With each one hundred pounds of the pulverized material there is to be mixed, say, thirty pounds of fluoride of soda. This mixture is then placed in a furnace or retort, or in crucibles, and melted into a mass, which converts it into fluoride of aluminium and fluoride of sodium. This compound fluoride is then ground to a powder, or reduced to very small pieces, and mixed with one-fifth of its weight of powdered charcoal, or with other carbonaceous substances, the different kinds of oil being well adapted to be used for this purpose. To each one hundred pounds of this powdered substance twenty-five pounds of chloride of potassium and ten pounds of chloride of sodium are to be added and thoroughly mixed together and made into cakes or balls with the aid of water, if necessary, the two last-named ingredients being melted together before mixing them with the others. Other forms of flux may be used at this point; but I prefer that above described. When the ingredients have been treated as above indicated, the whole mass is placed in a suitable oven, and its moisture expelled by heat. In carrying forward the next step of my process the dried material is placed in a retort provided with a false bottom or perforated diaphragm, upon which the material is placed, it being some distance above the bottom of the retort or furnace. This last-named retort is connected with another, in which there is put, say, twenty parts, by weight, of calcined soda-ash or carbonate of soda, ten parts of powdered charcoal, and five of chalk, lime, or its carbonates. This compound, when well mixed together, is placed in a retort which is connected with the one in which the fluoride under treatment is placed, so that the gas generated in the former may pass freely to the latter. As a matter of convenience I prefer to put the compound from which the gas or vapor is derived into tubes made of asbestus or some other material that will preserve the form of the package while heat is being applied to it; but it may be placed upon the bottom of the retort without materially affecting the results. At this point in the process external heat is applied to both of the last-named retorts, and the one in which the material to be gasified is placed is gradually heated up to nearly a white-heat, the effect of which is to cause a sodium-vapor to be produced from the soda and charcoal, and which passes into the retort having the perforated diaphragm and comes into contact with the material placed therein, thus causing a chemical reaction upon it, the result of which is to precipitate upon the bottom of the retort the metal contained in it.

I desire it to be understood that in giving proportions of materials used in carrying out my process or method I do not intend to confine myself to the exact quantities there named, as experience has taught me that they may be varied to some extent without materially changing the results. I have named such quantities as I have found to produce satisfactory results.

I believe that it will be found that the process herein described will be useful in the treatment of other ores and substances than those containing aluminium—such, for example, as the ores and compounds of magnesium and boron; and hence I do not limit my discovery to the treatment of aluminium ores only, but intend to reserve the right to use it in connection with any substances to which it may be applicable.

It will be seen in this process that the production of sodium-vapor is going on simultaneously with its action as a reducing agent upon the aluminium compound. Moreover, equivalents for the substances here named may be employed, and some of the substances named may be omitted without entirely destroying all useful results.

I do not intend in this application to claim reducing fluorides of aluminium by means of a vapor generated from metallic sodium, as heretofore practised, or the step of generating sodium in the manner herein described; neither do I claim as my invention the double operation of reducing the fluoride of aluminium to the condition of chloride, and finally reducing this salt by means of a vapor, as claimed in my application Serial No. 87,648.

Having thus described my invention or discovery, what I claim, and desire to secure by Letters Patent, is—

1. The process of producing metallic aluminium which consists in mixing the compound containing aluminium with carbonaceous material, and then subjecting the mixture to a high temperature, and simultaneously to the action of sodium-vapor produced from a mixture of a sodium compound and carbon, substantially as described.

2. The process of producing metallic aluminium which consists in mixing the fluoride of aluminium with carbonaceous material, and then subjecting the mixture to a high temperature, and simultaneously to the action of sodium-vapor produced from a mixture of a sodium salt and carbon, substantially as described.

3. The process of producing metallic aluminium which consists in mixing the double fluoride of aluminium and sodium or potassium with carbonaceous material, and then subjecting the mixture to a high temperature, and simultaneously to the action of sodium-vapor produced from a mixture of a sodium compound and carbon, substantially as described.

4. The process of producing metallic aluminium which consists in mixing the substances containing aluminium with carbonaceous material, and then subjecting the mixture in externally-heated vessels to a high temperature, and simultaneously to the action of sodium-vapor produced from a compound containing sodium and a carbonaceous reducing agent, substantially as described.

WILLIAM FRISHMUTH.

Witnesses:
EMERSON FOOTE,
FRANCIS B. CROCKER.